(12) United States Patent
Tsai

(10) Patent No.: US 7,816,624 B2
(45) Date of Patent: Oct. 19, 2010

(54) DEVICE FOR STRIPPING OUTER COVERING OF CABLE

(75) Inventor: Kun-Jung Tsai, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1086 days.

(21) Appl. No.: 11/309,600

(22) Filed: Aug. 29, 2006

(65) Prior Publication Data
US 2007/0151959 A1    Jul. 5, 2007

(30) Foreign Application Priority Data
Dec. 30, 2005    (CN)    ......................... 2005 1 0121398

(51) Int. Cl.
*B23K 26/36* (2006.01)

(52) U.S. Cl. .............................. 219/121.68; 219/121.78

(58) Field of Classification Search ................................
219/121.63–121.69, 121.72, 121.78; 29/33.52; 81/9.4
See application file for complete search history.

(56) References Cited

U.S. PATENT DOCUMENTS

| 3,629,891 | A | * | 12/1971 | Morrone | ......................... | 15/4 |
|---|---|---|---|---|---|---|
| 3,949,186 | A | * | 4/1976 | Nakayama et al. | ...... | 219/121.14 |
| 3,953,706 | A |   | 4/1976 | Harris et al. |   |   |
| 4,001,543 | A | * | 1/1977 | Bove et al. | ............. | 219/121.63 |
| 4,044,936 | A | * | 8/1977 | Obersby et al. | ................ | 225/2 |
| 4,048,464 | A | * | 9/1977 | Gale et al. | ............. | 219/121.67 |
| 4,088,865 | A | * | 5/1978 | Peters et al. | ........... | 219/121.63 |
| 4,160,894 | A | * | 7/1979 | Stemmler et al. | ...... | 219/121.67 |
| 4,258,246 | A | * | 3/1981 | Karube et al. | ............. | 219/121.8 |
| 4,326,118 | A | * | 4/1982 | Smith | ..................... | 219/121.63 |
| 4,533,814 | A | * | 8/1985 | Ward | ..................... | 219/121.64 |
| 4,577,087 | A | * | 3/1986 | Chadwick | .............. | 219/121.63 |
| 4,591,294 | A | * | 5/1986 | Foulkes | ........................ | 405/170 |
| 4,638,143 | A | * | 1/1987 | Akeel | ..................... | 219/121.74 |
| 4,644,128 | A | * | 2/1987 | Palentyn et al. | ......... | 219/121.67 |
| 4,671,848 | A | * | 6/1987 | Miller et al. | ................... | 216/65 |
| 4,694,139 | A | * | 9/1987 | Roder | ..................... | 219/121.78 |
| 4,761,535 | A | * | 8/1988 | Lawson | ................. | 219/121.68 |
| 4,971,418 | A | * | 11/1990 | Dorsey et al. | ................. | 385/96 |
| 5,267,959 | A | * | 12/1993 | Forman | ........................ | 604/103 |
| 5,501,759 | A | * | 3/1996 | Forman | .................... | 156/272.8 |
| 5,560,843 | A | * | 10/1996 | Koike et al. | ............. | 219/121.48 |
| 5,744,776 | A | * | 4/1998 | Bauer | ....................... | 219/121.7 |
| 5,837,961 | A | * | 11/1998 | Miller | .................... | 219/121.68 |
| 6,046,428 | A |   | 4/2000 | Serruys |   |   |
| 6,130,404 | A | * | 10/2000 | Campagna et al. | ..... | 219/121.69 |

(Continued)

*Primary Examiner*—Samuel M Heinrich
(74) *Attorney, Agent, or Firm*—Jeffrey T. Knapp

(57) ABSTRACT

A device (100) for stripping an outer covering (141) of a cable (140) includes a base (110) having a shaft (111) coupled thereto, a laser generator (130) configured for emitting a laser beam and a rotating arm (120). The shaft defines a central axis configured for coaxial alignment with the cable. The laser generator is arranged at rest relative to the rotating arm. The rotating arm includes at least one light directing member configured for directing the laser beam emitted from the laser generator to impinge upon a circumference of the outer covering of the cable. The rotating arm is rotatable relative to the central axis associated with the shaft in a manner such that the circumference of the outer covering of the cable can be impinged upon by the laser beam thus stripping the outer covering of the cable.

7 Claims, 5 Drawing Sheets

U.S. PATENT DOCUMENTS

| | | | |
|---|---|---|---|
| 6,326,587 B1 * | 12/2001 | Cardineau et al. | 219/121.68 |
| 6,351,483 B1 * | 2/2002 | Chen | 372/101 |
| 6,603,094 B2 * | 8/2003 | Miller | 219/121.68 |
| 6,653,592 B2 * | 11/2003 | Andersen | 219/121.68 |
| 6,660,350 B1 * | 12/2003 | Campagna et al. | 428/36.91 |
| 6,868,599 B2 * | 3/2005 | Kato et al. | 29/564.4 |
| 2001/0046422 A1 * | 11/2001 | Colombo | 409/201 |
| 2002/0104833 A1 * | 8/2002 | Bradley | 219/121.63 |
| 2004/0134965 A1 * | 7/2004 | Stepan | 228/1.1 |
| 2005/0150522 A1 * | 7/2005 | Okada | 134/22.11 |

* cited by examiner

DEVICE FOR STRIPPING OUTER COVERING OF CABLE

FIELD OF THE INVENTION

The present invention relates to devices for stripping outer coverings of cables and, more particularly, to a device for stripping an outer covering of a cable with high efficiency.

DESCRIPTION OF RELATED ART

With the development of the technology, cables, such as electrical wires, are used in a wide range for different applications. Generally, the cable is covered by an outer covering. However when the cable is used, at least part of the outer portion of the cable should be removed.

Conventional methods for stripping an outer covering of a cable include using a knife or a scissors to cut the insulating layer. However, with the development of the technology cables are being made thinner and thinner. So the conventional method of using knife or scissors cannot satisfy the need for the high precision work. Furthermore, the method of using knife or scissors has a low cutting speed and is prone to destroy the cables.

To solve the problem, a conventional device using laser beams is used to strip the outer covering of the cable. The device emits laser beams to cut the insulating layer, so the device has a high precision, high speed and can avoid destroying the electrical wires.

However, since the cables are generally circular, the conventional device using laser beams can only cut a part of the outer covering opposite to the device and the other part of the outer covering cannot be effectively stripped.

What is needed, therefore, is a device using laser beams which can effectively strip an outer covering of a cable.

SUMMARY OF THE INVENTION

A device for stripping an outer covering of a cable according to one preferred embodiment includes a base have a shaft coupled thereto, a laser generator configured for emitting a laser beam and a rotating arm. The shaft defines a central axis configured for coaxial alignment with the cable. The laser generator is arranged at rest relative to the rotating arm. The rotating arm includes at least one light directing member configured for directing the laser beam emitted from the laser generator to impinge upon a circumference of an outer covering of the cable. The rotating arm is rotatable relative to the central axis associated with the shaft in a manner such that the circumference of the outer covering of the cable can be impinged upon by the laser beam thus stripping the outer covering of the cable.

A device for stripping an outer covering of a cable according to another preferred embodiment includes a base having a shaft coupled thereto, a laser generator configured for emitting a laser beam, and a rotating arm with the laser generator mounted thereon. The shaft defines a central axis configured for coaxial alignment with the cable. The rotating arm is rotatable relative to the central axis associated with the shaft in a manner such that a circumference of the outer covering of the cable can be impinged upon by the laser beam thus stripping the outer covering of the cable.

The device uses the rotating arm rotatable relative to the central axis associated with the shaft for stripping the outer covering of the cable. Because of the rotation of the rotating arm, the circumference of the outer covering of the cable is impinged upon by the laser beam so that the outer covering of the cable can be efficiently stripped off.

Other advantages and novel features will become more apparent from the following detailed description of present device for stripping an outer covering of a cable, when taken in conjunction with the accompanying drawings.

BRIEF DESCRIPTION OF THE DRAWINGS

Many aspects of the present device for stripping an outer covering of a cable can be better understood with reference to the following drawings. The components in the drawings are not necessarily drawn to scale, the emphasis instead being placed upon clearly illustrating the principles of the present device for stripping an outer covering of a cable. Moreover, in the drawings, like reference numerals designate corresponding parts throughout the several views.

DETAILED DESCRIPTION OF THE INVENTION

Reference will now be made to the drawings to describe a preferred embodiment of the present device for stripping an outer covering of a cable, in detail.

Figure 1:
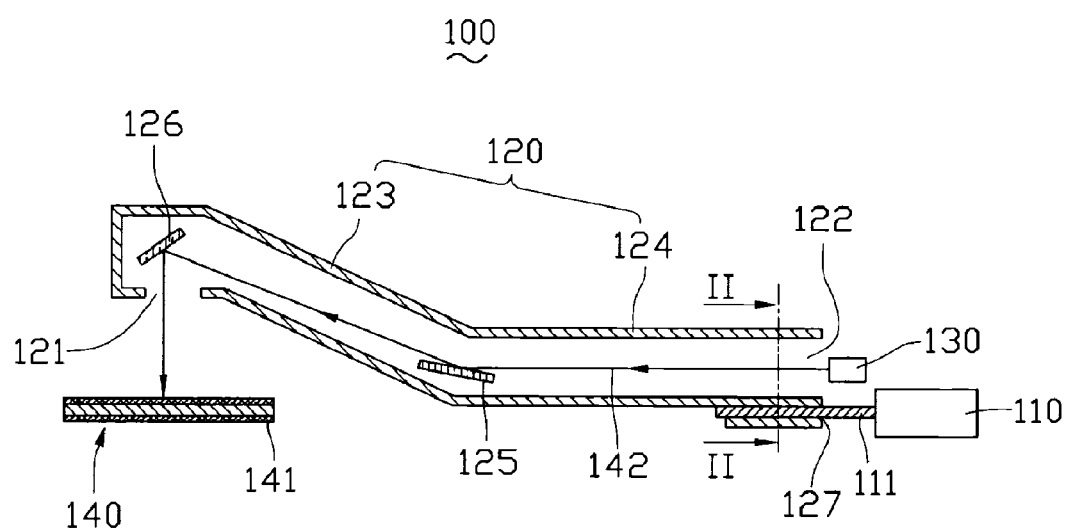
FIG. 1 is an schematic, side view of a device for stripping an outer covering of a cable in accordance with a first preferred embodiment.
Figure 2:
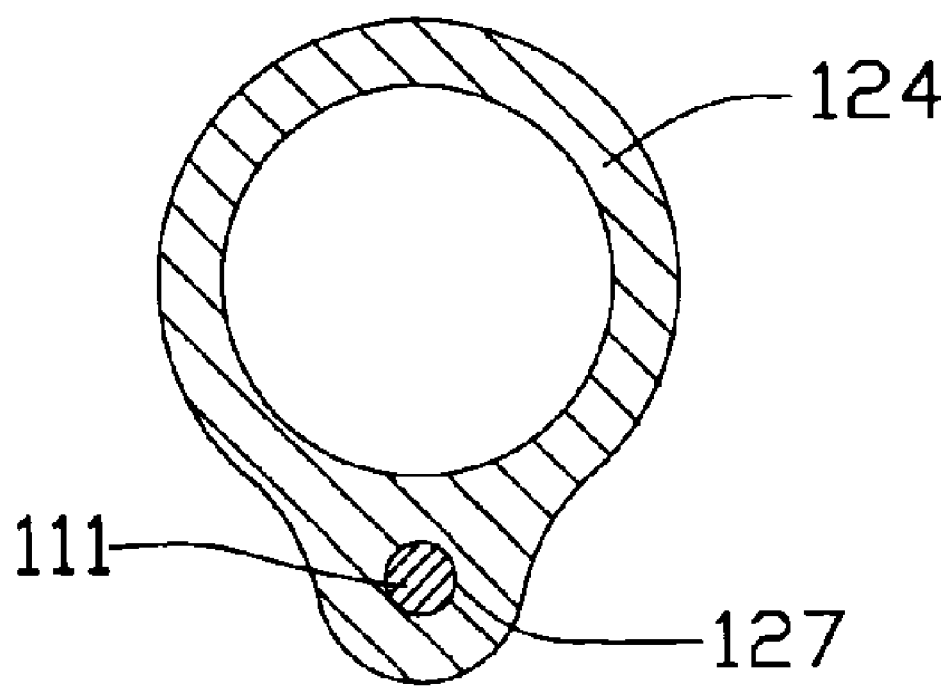
FIG. 2 is a schematic, cross-sectional view of the device taken along line II-II of FIG. 1.

Referring to FIGS. 1 and 2, a device 100 for stripping an outer covering 141 of a cable 140 in accordance with a preferred embodiment, includes a base 110 having a shaft 111 coupled thereto, a rotating arm 120 pivotally connected with the base 110, and a laser generator 130 for emitting a laser beam.

The shaft 111 defines a central axis for coaxial alignment with the cable 140. The shaft 111 extends from a surface of the base 110 and is substantially a solid pole. The shaft 111 may be integrally formed with the base 110.

The rotating arm 120 includes an inlet 122 and an outlet 121. The laser generator 130 is arranged adjacent to the inlet 122 of the rotating arm 120 and arranged at rest relative to the rotating arm 120. The rotating arm 120 further includes at least one light directing member for directing the laser beam emitted from the laser generator 130 to impinge upon a circumference of the outer covering 141 of the cable 140.

The rotating arm 120 further includes a through hole 127 arranged adjacent to the inlet 122. The shaft 111 is inserted into the through hole 127, thereby allowing the rotating arm 120 to be rotatable relative to the base 110. The laser generator 130 is also rotatable relative to the base together with the rotating arm 120.

The rotating arm 120 further includes a first portion 124 parallel to the shaft 111 of the base 110 and a second portion 123 extending from the first portion 124. The first portion 124 and the second portion 123 cooperatively define an angle therebetween, and the angle is in a range from 120 to 165 degrees.

The at least one light directing member includes a first reflection mirror 125 arranged between the first portion 124 and the second portion 123 and a second reflection mirror 126 arranged adjacent to the outlet 121. The first reflection mirror 125 is configured for reflecting the laser beam from the laser generator 130 to the second portion 123. The second reflection mirror 126 is configured for reflecting the laser beam from the first reflection mirror 125 to the circumference of the outer covering 141 of the cable 140.

The laser generator 130 can be an ultraviolet laser generator or a carbon dioxide laser generator configured for emitting a laser beam. In this embodiment, laser generator 130 and the rotating arm 120 are rotatable in unison relative to the base 110. The laser generator 130 can be mounted on the first portion 124 of the rotating arm 120.

In operation, the laser generator 130 emits a laser beam and the laser beam enters the rotating arm 120 through the inlet 122. The laser beam impinges on and is reflected by the first reflection mirror 125 and the second reflection mirror 126, the laser beam then exits from the outlet 121 of the rotating arm 120 to the cable 140 to strip a part of the outer covering 141 opposite to the outlet 126 of the rotating arm 120. Then rotating the rotating arm 120, the other part of the outer covering 141 is stripped from the cable 140 by the laser beam.

Compared with the conventional device for stripping an outer covering of a cable, the present device 100 has following advantages. The present device 100 uses the rotating arm 120 for stripping the outer covering 141 of the cable 140. Because of the rotation of the rotating arm 120, the circumference of the outer covering 141 can be effectively stripped.

Figure 3:
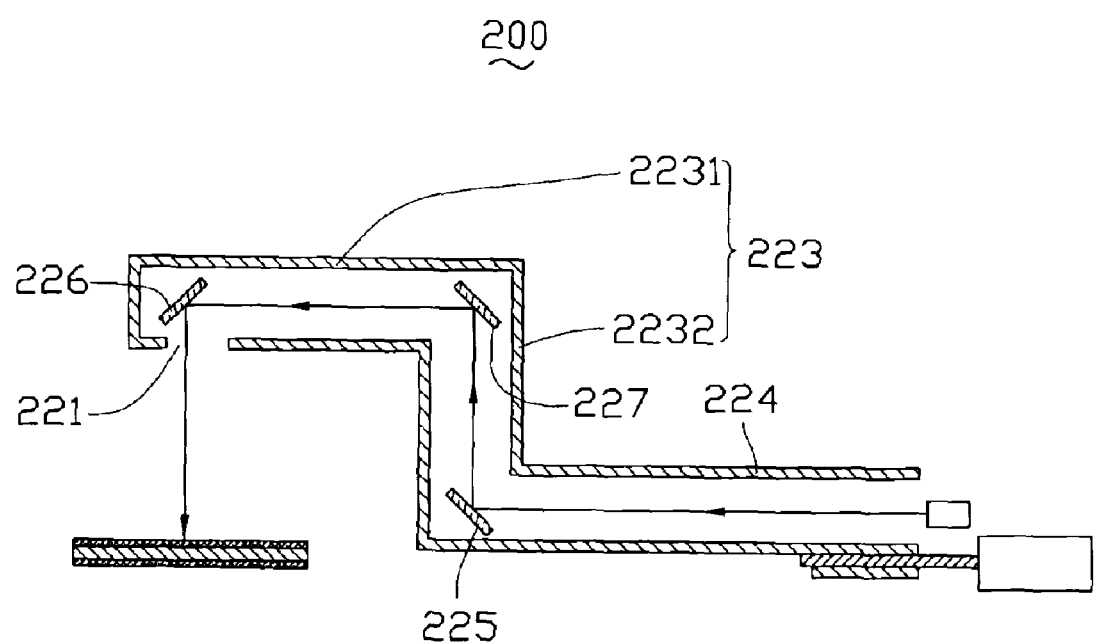
FIG. 3 is a schematic, side view of a device for stripping an outer covering of a cable in accordance with a second preferred embodiment.

Referring to FIG. 3, a device 200 for stripping an outer covering of a cable in accordance with a second preferred embodiment is shown. The device 200 in accordance with the second preferred embodiment is similar to that of the first embodiment, except that the second portion 223 includes a perpendicular portion 2232 extending from the first portion 224, which is perpendicular to the first portion 224, and a parallel portion 2231 extending from the perpendicular portion 2232, which is perpendicular to the perpendicular portion 2232. Furthermore, the at least one light directing member further includes a third reflection mirror 227 arranged between the perpendicular portion 2232 and the parallel portion 2231 for reflecting the laser beams from the first reflection mirror 225 to the second reflection mirror 226.

Figure 4:
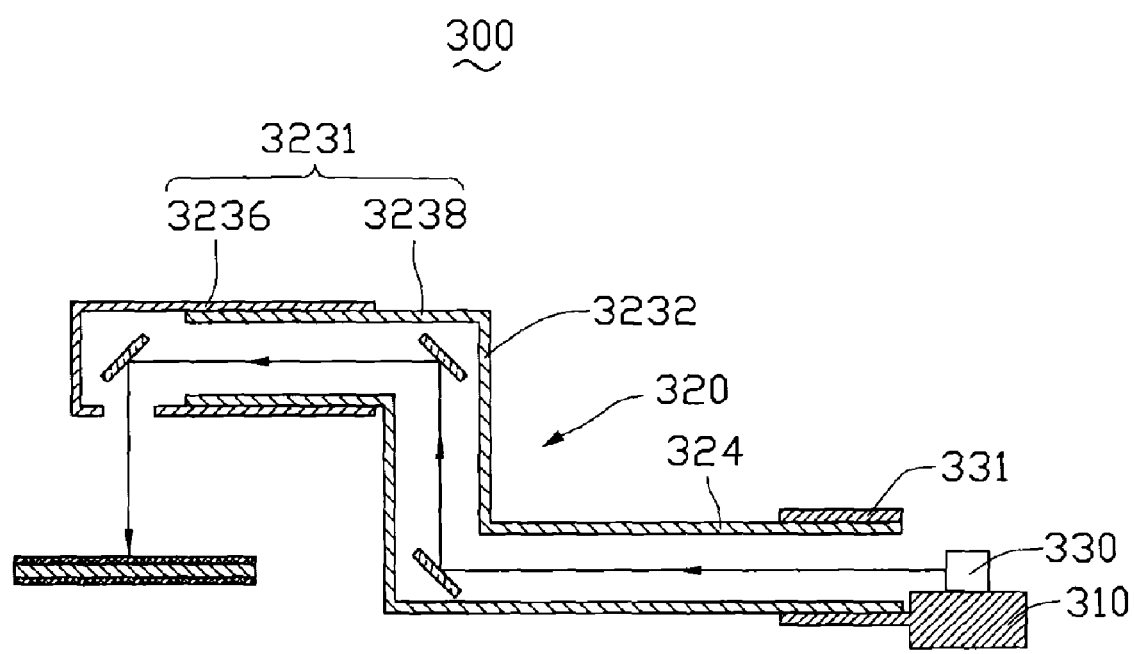
FIG. 4 is a schematic, side view of a device for stripping an outer covering of a cable in accordance with a third preferred embodiment.

Referring to FIG. 4, a device 300 for stripping an outer covering of a cable in accordance with a third preferred embodiment is shown. The device 300 in accordance with the second preferred embodiment is similar to that of the second embodiment, except that the parallel portion 3231 of the rotating arm 320 includes a telescoping assembly having an outer tube 3236 and an inner tube 3238 slidably received in the outer tube 3236 for increasing the length of the rotating arm 320.

The shaft 331 may be a hollow tube. The first portion 324 of the rotating arm 320 is inserted into the shaft 331 for being rotatable relative to the shaft 331. The laser generator 330 can be mounted on the base 310.

Figure 5:
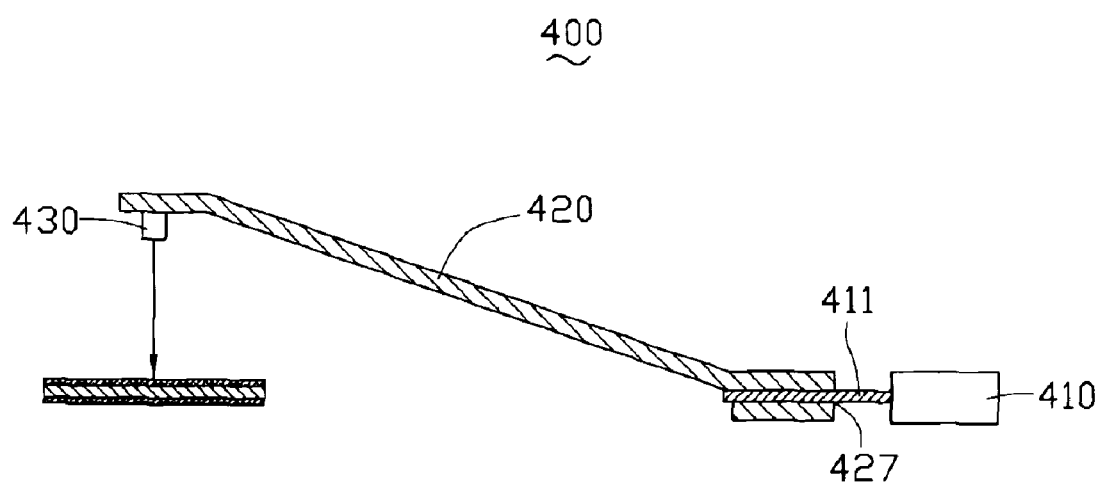
FIG. 5 is a schematic, side view of a device for stripping an outer covering of a cable in accordance with a fourth preferred embodiment.

Referring to FIG. 5, a device 400 for stripping an outer covering of a cable in accordance with a fourth preferred embodiment is shown. The device 400 in accordance with the fourth preferred embodiment is similar to that of the first embodiment, except that the rotating arm 420 is solid. A through hole 427 is arranged at one distal end of the rotating arm 420 for rotatably receiving the shaft 411 of the base 410. A laser generator 430 is mounted on the another distal end of the rotating arm 420 for emitting a laser beam to strip the outer covering of the cable.

It is to be understood that the above-described embodiment is intended to illustrate rather than limit the invention. Variations may be made to the embodiment without departing from the spirit of the invention as claimed. The above-described embodiments are intended to illustrate the scope of the invention and not restricted to the scope of the invention.

What is claimed is:

1. A device for stripping an outer covering of a cable, comprising:
    a base having a shaft coupled thereto, the shaft defining a central axis configured for coaxial alignment with the cable;
    a laser generator configured for emitting laser beams; and
    a rotating arm, the laser generator being arranged at rest relative to the rotating arm, the rotating arm comprising:
    a hollow tube; and
    at least one light directing member fixedly mounted in the hollow tube, the at least one light directing member configured for directing the laser beam emitted from the laser generator to impinge upon a circumference of the outer covering of the cable, the rotating arm being rotatable relative to the central axis associated with the shaft in a manner such that the circumference of the outer covering of the cable can be impinged upon by the laser beam thus stripping the outer covering of the cable;
    wherein the hollow tube comprises a first portion and a second portion;
    the first portion is parallel to the shaft and defines an inlet for receiving the laser beams from the laser generator;
    the second portion extends from the first portion, a part of the second portion nearest to the first portion defines an inner tube of the second portion, the second portion also comprises an outer tube slidably attached to the inner tube, and the outer tube defines an outlet for emission of the laser beams to the cable;
    the inner tube comprises a perpendicular portion extending from the first portion and being perpendicular to the first portion, and a parallel portion extending from the perpendicular portion and being perpendicular to the perpendicular portion;
    the outer tube is arranged around the parallel portion of the inner tube and slidably attached to the parallel portion; and
    the at least one light directing member comprises a reflection mirror arranged in the inner tube of the second portion of the hollow tube where the perpendicular portion adjoins the parallel portion.

2. The device as claimed in claim 1, wherein the shaft is hollow.

3. The device as claimed in claim 2, wherein a portion of the first portion with the inlet defined therein is rotatably received in the shaft.

4. The device as claimed in claim 3, wherein the laser generator is mounted on the base.

5. The device as claimed in claim 1, wherein the at least one light directing member comprises a first reflection mirror arranged between the first portion and the second portion configured for reflecting the laser beam emitted from the laser generator to the second portion.

6. The device as claimed in claim 5, wherein the at least one light directing member further comprises a second reflection mirror arranged in the parallel portion of the inner tube for reflecting the laser beam directly to the outer circumference of the cable through the outlet.

7. The device of claim 1, wherein the first portion and the second portion are integrally connected.

* * * * *